W. W. SWAN.
MOTOR VEHICLE.
APPLICATION FILED NOV. 23, 1916.
1,244,001.
Patented Oct. 23, 1917.
3 SHEETS—SHEET 2.
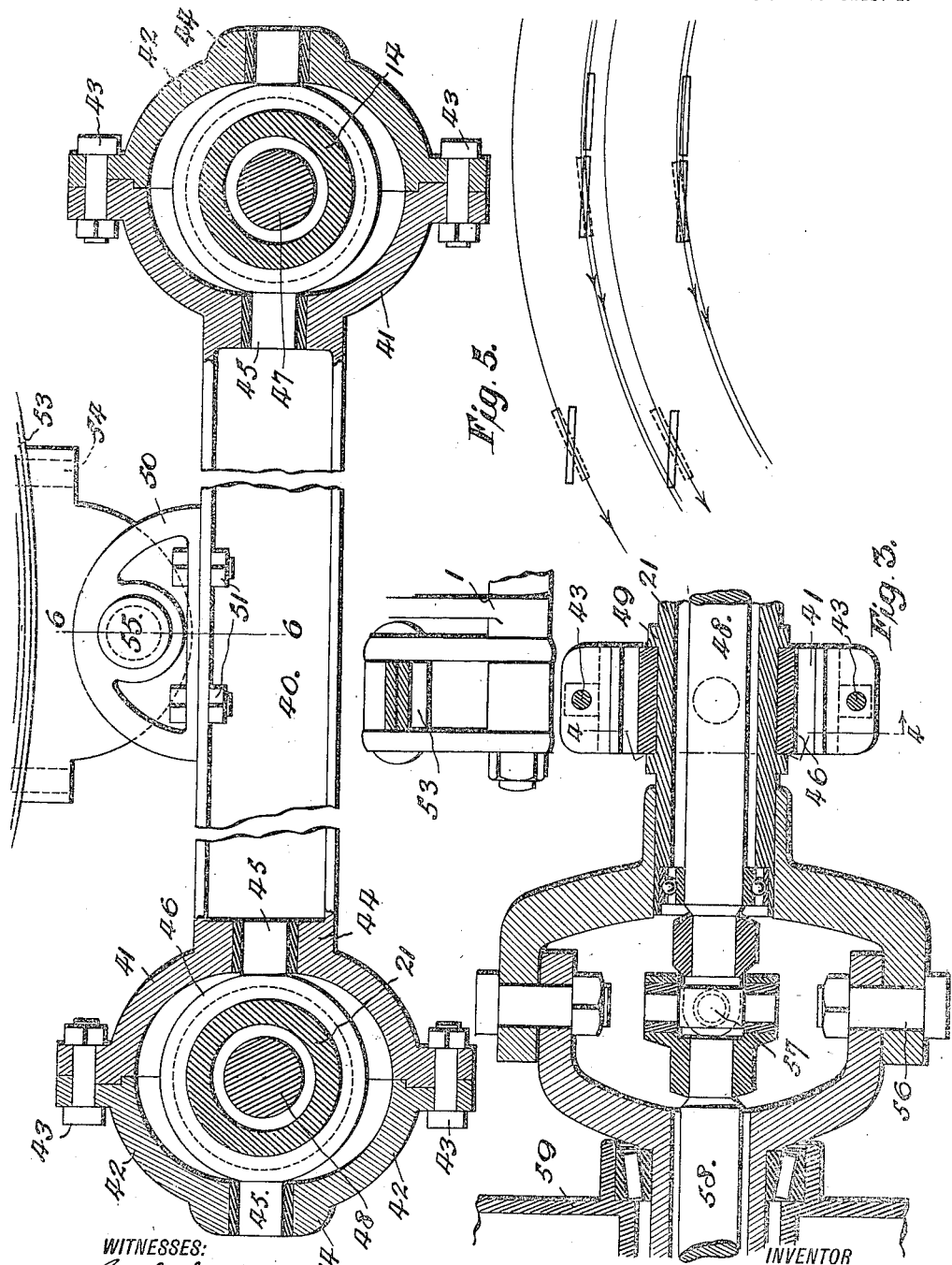
WITNESSES:
John B. Schrott
INVENTOR
Walter W. Swan.
BY
Fred G. Dieterich
ATTORNEYS

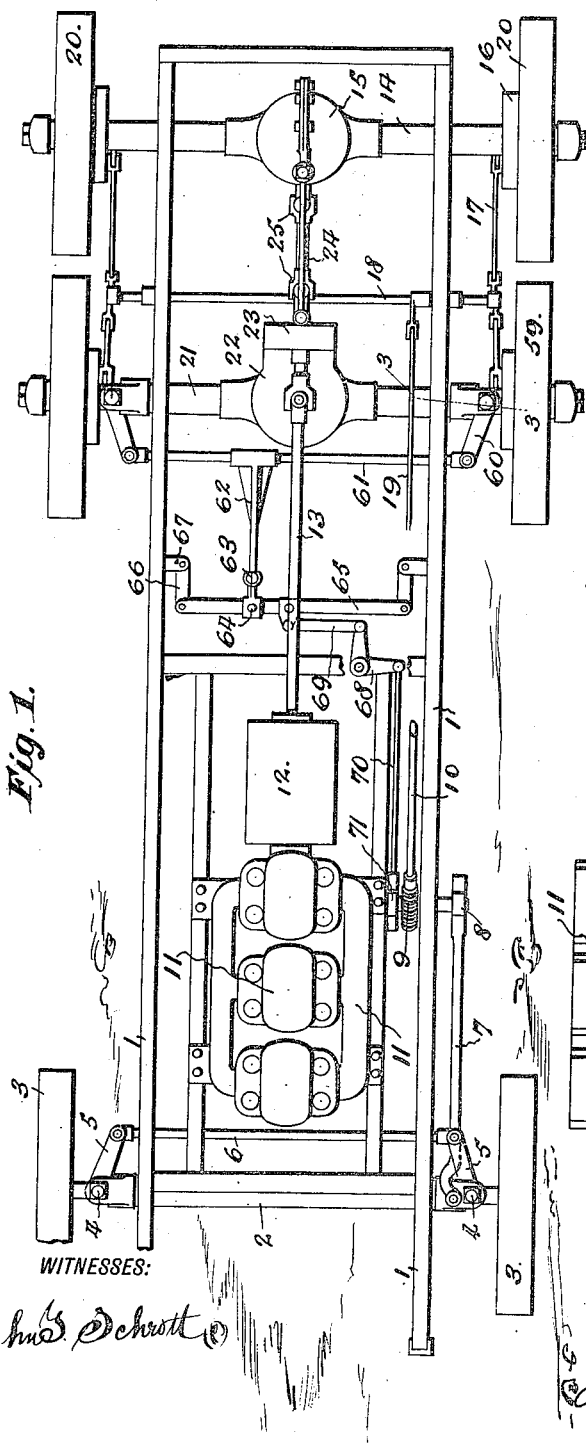

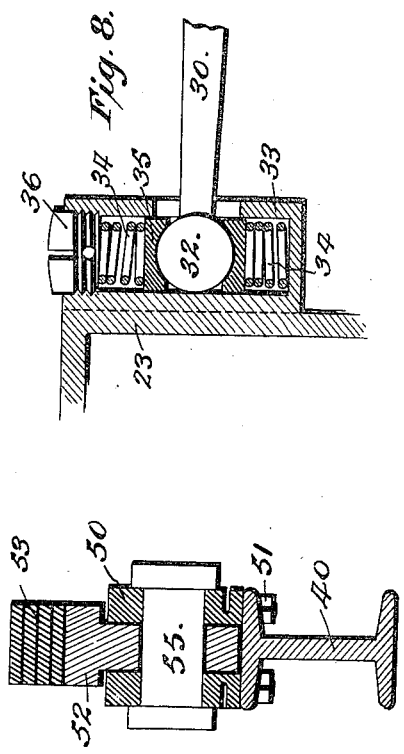
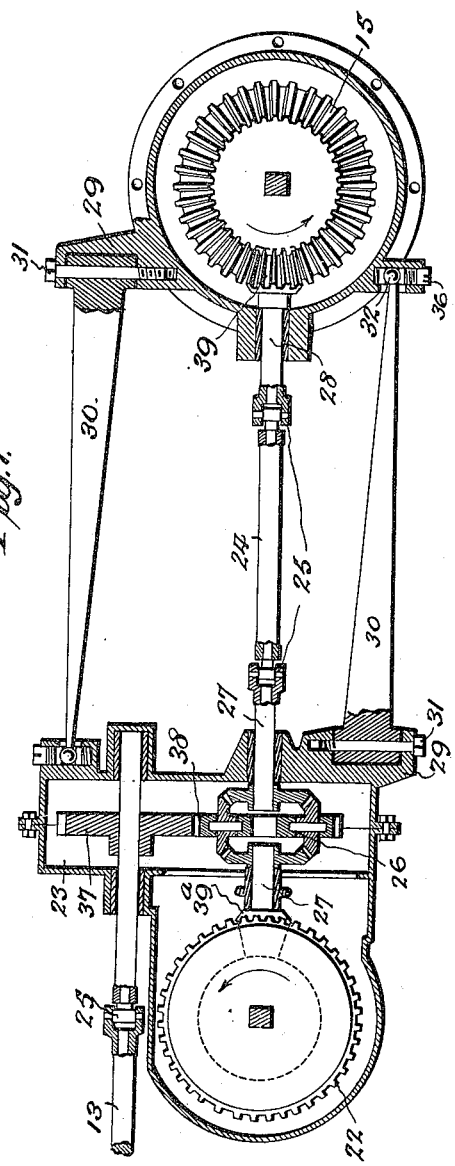

UNITED STATES PATENT OFFICE.

WALTER W. SWAN, OF PORTLAND, OREGON.

MOTOR-VEHICLE.

1,244,001.  Specification of Letters Patent.  Patented Oct. 23, 1917.

Application filed November 23, 1916. Serial No. 133,017.

*To all whom it may concern:*

Be it known that I, WALTER W. SWAN, residing at Portland, in the county of Multnomah and State of Oregon, have invented certain new and useful Improvements in Motor-Vehicles, of which the following is a specification.

My invention has for its object to provide certain new and useful improvements in motor vehicles and it particularly provides a structure that is especially adapted for use on motor busses, fire engines, hearses, motor ambulances, trucks and other motor vehicles upon which pneumatic tires are impractical.

The invention also has for its object to provide increased traction on slippery roads and streets and reduces the tendency of the vehicle to skid.

The invention provides a device of the six wheel type in which provision is made for grouping four wheels in two sets at the rear of the frame and a pair of wheels in one set at the front, the front wheels being of the usual type and construction with knuckle steering connections between the wheels and axles, the rear pair of wheels being of the usual type and construction, with a differential connection between the wheels on the rear axle, while the intermediate set is provided with a differential axle construction combined with the wheels, the two rear sets of axles and wheels being flexibly mounted on a spring suspension which also comprises one of the improved features of my vehicle; the drive shaft has a separate differential connection with the jack shaft that connects the driving pinions of the rear and intermediate differentials, torsion rods being provided between the rear and intermediate axle housings for the usual purposes and universal joints are provided in the jack shaft and drive shafts where found desirable.

The invention also includes an improved steering connection between the front wheel knuckles and the intermediate wheel knuckles so that the proper steering action may be simultaneously applied to the front and intermediate wheels in order to enable the truck to turn in a relatively short space with wheels in proper radius.

The invention further resides in those novel details of construction, combination and arrangement of parts, all of which will be first fully described, then specifically pointed out in the appended claims, and illustrated in the accompanying drawings, in which:

Figure 1 is a top plan view of a chassis constructed in accordance with my invention.

Fig. 2 is a side elevation of the same, parts being broken away and other parts being shown in section.

Fig. 3 is an enlarged detail vertical section on the line 3—3 of Fig. 1.

Fig. 4 is an enlarged side elevation and part section on the line 4—4 of Fig. 3 showing one of the supplemental frame bars with its trunnion bearing arrangement for the intermediate and rear axle housings and showing the pivotal connection with the spring saddle block.

Fig. 5 is a diagrammatic view showing the manner in which the steering mechanism turns the front and intermediate wheels to effect the proper steering of the vehicle.

Fig. 6 is a detail cross section on the line 6—6 of Fig. 4.

Fig. 7 is an enlarged detail central section through the intermediate and rear axle structures showing the connections of the jack shaft with the differential pinions and with the third differential gearing that connects the jack shaft with the engine drive shaft.

Fig. 8 is an enlarged detail section of the ball end of one of the tension rods.

In the drawings, in which like numerals and letters of reference indicate like parts in all of the figures, 1 represents the chassis frame which may be constructed of the ordinary materials, and 2 indicates the usual front axle on which the front wheels 3 are mounted through the medium of knuckle connections 5 pivoted on vertical axes 4, the arms of the knuckles 5 being connected together by the usual connecting rod 6 which in turn is connected by the rod 7 to the crank 8 of the steering gear, the crank 8 being driven by the usual worm and gear connection 9 from the steering shaft 10 on which the usual hand wheel, (not shown) is mounted.

11 designates the engine which also may be of any desired construction as may also be the transmission 12. 13 is the driving shaft from the transmission which shaft includes a universal joint 25 and has its end mounted in suitable bearings in the housings 23. The shaft 13 carries a gear 37 which meshes with the drive gear 38 of the differential mechanism 26 that is carried on the jack shaft section 27—27.

14 is the rear axle which may be of the usual construction and on which the rear wheels 20 are mounted in the usual manner, the rear axle structure 14 including a differential 15 of the usual type whose driving pinion is mounted on the jack shaft section 28 (see Fig. 7). The jack shaft consists of the sections 27—28 and the connecting section 24 which is joined to the other sections by universal joints 25.

16 designates the usual brake drums, 17 the brake operating rods and 18 the rock shaft which is connected with the rod 17 by levers and is itself operated by the brake rod 19 that connects with the usual brake pedal or lever (not shown).

21 is the intermediate axle structure which is also provided with a differential 22 whose drive pinion is carried on the front jack shaft section 27. The construction of the differentials 15 and 22 may be of the ordinary type as the same, *per se*, form no part of the present invention.

29 designates bearings in which the torsion rods 30 are pivoted on spindles 31 that lie in a vertical direction and the torsion rods 30 have ball ends 32 which are mounted in anti-rattling sockets 33, the balls 32 engaging thrust plates 35 which bear against springs 34 whose tension may be adjusted by the usual nut 36.

39—39ª designates the rear and intermediate drive pinions of the differentials 15—22, respectively.

40 designates supplemental frame bars which lie parallel to the sides of the frame 1 and preferably directly beneath the same near the rear. The bars 40 are of the usual channel section and terminate at their front and rear ends in half yoke members 41 which match with cap yokes 42 and the cap yokes are secured to the half yokes 41 by bolts 43.

44 designates trunnion bearings in longitudinal alinement preferably in the longitudinal axes of the bars 40 in which the trunnions 45 of axle housing receiving rings 46 are located, the rings 46 being designed to receive axle housings and the housings are held against lateral displacement with relation to the rings by collars 49.

50 designates a bearing member which is pivoted by a bolt 55 to the spring saddle block 52 and which is secured to the respective bar 40 by bolts 51. The saddle block 52 is clipped to the spring by spring clips passing through the bores 54 of the saddle blocks to fasten the springs 53 to the saddle blocks in the usual manner.

The springs 53 are secured to the frame in the usual way by shackles or in any other desired manner, it being understood that there is a supplemental frame bar 40 at each side of the frame 1, there being a corresponding number of springs and connections between the springs and the supplemental frame bar.

The axle 48 of the intermediate axle structure has a universal drive connection 57 with the wheel stub shaft 58 on which the wheel 59 is secured and a knuckle bearing support 60 is provided which is fulcrumed on the vertical fulcrum bolts 56 in the usual way so that the wheels 59 are combined driving and steering wheels, the steering action being effected by connecting the knuckle 60 with a connecting rod 61 to which the supplemental steering gear is secured. The supplemental steering gear consists of a crank 71 operated by the worm gear 9 and connected by a rod 70 with a bell crank 68 which is in turn linked at 69 to a cross rod 65 which is linked at 66 to bracket 67 so as to have lateral motion.

64 is an arm connected to the rod 65 and having a ball and socket joint 63 with the arm 62 on the rod 61, the movements of the knuckles 5 and 60 being so correlated that when the steering shaft 10 is turned the wheels 3 and 59 will be turned to their proper angles in effecting the steering of the machine.

47 is the drive shaft of the rear axle structure 14 (see Fig. 4).

From the foregoing description it will be seen that in my construction I provide a positive drive on four wheels, thus increasing the tractive effect of the vehicle and at the same time I provide for employing four of the wheels as steering wheels, thus insuring a proper turning of the vehicle without slipping.

Furthermore by providing the supplemental frame bars with their rocking connections to the springs and providing the trunnion ring supports for the axles or in the ends of the supplemental frame bars a very flexible "rear truck" construction is obtained so that any one of the wheels may have an independent action in rising over obstructions or entering into depressions, the strains being well distributed and taken care of.

From the foregoing taken in connection with the accompanying drawings, it is thought the complete construction, operation and advantages of my invention will be readily understood by those skilled in the art.

What I claim is:—

1. In combination with the chassis frame, the front axle and the front steering wheels mounted thereon, of supplemental frame bars, means for pivotally supporting said bars beneath said chassis frame, a rear axle structure including a housing, supports carried by said supplemental bars for said axle housing, rear wheels mounted on said rear axle structure, said rear axle structure including a differential, an intermediate axle structure including a housing and a differential and combined driving and steering knuckles, intermediate wheels mounted on said knuckles, a jack shaft structure between said rear and intermediate axle differentials, said jack shaft structure including a third differential, a driving shaft operatively connected with said third differential, and a steering mechanism operatively connected with said front wheels and with the intermediate wheels.

2. In combination with the chassis frame, the front axle and the front steering wheels mounted thereon, of supplemental frame bars, means for pivotally supporting said bars beneath said chassis frame, a rear axle structure including a housing, supports carried by said supplemental bars for said rear axle housing, rear wheels mounted on said rear axle structure, said rear axle structure including a differential, an intermediate axle structure including a housing and a differential and combined driving and steering knuckles, intermediate wheels mounted on said knuckles, a jack shaft structure between said rear and intermediate axle differentials, said jack structure including a third differential, a driving shaft operatively connected with said third differential, a steering mechanism operatively connected with said front wheels and with said intermediate wheels, said rear and intermediate axle supports comprising bearings having trunnions journaled in said supplemental bars.

3. In combination with the chassis frame, the front axle and the front steering wheels mounted thereon, of supplemental frame bars, means for pivotally supporting said bars beneath said chassis frame, a rear axle structure including a housing, supports carried by said supplemental bars for said axle housing, rear wheels mounted on said rear axle structure, said rear axle structure including a differential, an intermediate axle structure including a housing and a differential and a combined driving and steering knuckle at each end, intermediate wheels mounted on said knuckles, a jack shaft structure between said rear and intermediate axle differentials, said jack shaft structure including a third differential, a driving shaft operatively connected with said third differential, a steering mechanism operatively connected with said front wheels and with the intermediate wheels, said connection between said supplemental bars and said frame comprising spring members and pivotal connections between said spring members and said supplemental bars whereby said supplemental bars may swing on a transverse horizontal axis.

4. In combination with the chassis frame, the front axle and the front steering wheels mounted thereon, of supplemental frame bars, means for pivotally supporting said bars beneath said chassis frame, a rear axle structure including a housing, supports carried by said supplemental bars for said axle housing, rear wheels mounted on said rear axle structure, said rear axle structure including a differential, an intermediate axle structure including a housing and a differential and combined driving and steering knuckles, intermediate wheels mounted on said knuckles, a jack shaft structure between said rear and intermediate axle differentials, said jack shaft structure including a third differential, a driving shaft operatively connected with said third differential, a steering mechanism operatively connected with said front wheels and with the intermediate wheels, said connection between said supplemental bars and said frame comprising spring members and pivotal connections between said spring members and said supplemental bars whereby said supplemental bars may swing on a transverse horizontal axis, said rear and intermediate axle supports comprising bearing rings having trunnions extending in the longitudinal direction of the vehicle, said supplemental bars having trunnion bearings to receive said trunnions whereby said trunnion rings may oscillate on axes parallel to the longitudinal direction of the frame.

5. In a motor vehicle, a chassis frame, a front axle structure, spring supports between said frame and said front axle structure, front steering wheels, steering knuckles connecting said wheels with said front axle structure, a connecting rod connecting said knuckles, a rear drive axle, an intermediate drive axle, rear drive wheels relatively fixed on said rear drive axle, intermediate drive wheels, knuckle-drive-joints between said intermediate drive axle and said intermediate drive wheels, a connecting rod between said knuckle-drive-joints, a steering mechanism operatively connected with the front and intermediate connecting rods to operate the same simultaneously, a power plant including a main drive shaft, differentials carried by said rear and intermediate drive shafts, a driving shaft between the respective differentials, a third differential coöperating with said driving shaft and a driving connection between said main drive shaft and said third differential, all being arranged whereby the rear and intermediate wheels may operate as driving wheels and the front and intermediate wheels as steering wheels, and means for connecting said chassis frame with the front and rear axle structures.

6. In a motor vehicle, a chassis frame, a front axle structure, spring supports between said frame and said front axle structure, front steering wheels, steering knuckles connecting said wheels with said front axle structure, a connecting rod connecting said knuckles, a rear drive axle, an intermediate axle, rear drive wheels relatively fixed on said rear drive axle, intermediate drive wheels, knuckle-drive-joints between said intermediate drive axle and said intermediate drive wheels, a connecting rod between said knuckle-drive-joints, a steering mechanism operatively connected with the front and intermediate connecting rods to operate the same simultaneously, a power plant including a main drive shaft, differentially carried by said rear and intermediate drive shafts, a driving shaft between the respective differentials, a third differential coöperating with said driving shaft and a driving connection between said main drive shaft and said third differential, all being arranged whereby the rear and intermediate wheels may operate as driving wheels and the front and intermediate wheels as steering wheels, and means for flexibly connecting said chassis frame with the front and rear axle structures.

7. In a motor vehicle, a chassis frame, a front axle structure, spring supports between said frame and said front axle structure, front steering wheels, steering knuckles connecting said wheels with said front axle structure, a connecting rod connecting said knuckles, a rear drive axle, an intermediate drive axle, rear drive wheels relatively fixed on said rear drive axle, intermediate drive wheels, knuckle-drive-joints between said intermediate drive axle and said intermediate drive wheels, a connecting rod between said knuckle-drive-joints, a steering mechanism operatively connected with the front and intermediate connecting rods to operate the same simultaneously, a power plant including a main drive shaft, differentials carried by said rear and intermediate drive shafts, a driving shaft between the respective differentials, a third differential coöperating with said driving shaft and a driving connection between said main drive shaft and said third differential, all being arranged whereby the rear and intermediate wheels may operate as driving wheels and the front and intermediate wheels as steering wheels, means for flexibly connecting said chassis frame with the front and rear axle structure, said flexible connecting means comprising supplemental frame bars flexibly connected at their ends with the respective rear and intermediate axle structure and pivotally connected with the chassis frame.

8. In a motor vehicle, a chassis frame, a front axle structure, spring supports between said frame and said front axle structure, front steering wheels, steering knuckles connecting said wheels with said front axle structure, a connecting rod connecting said knuckles, a rear drive axle, an intermediate drive axle, rear drive wheels relatively fixed on said rear drive axle, intermediate drive wheels, knuckle-drive-joints between said intermediate drive axle and said intermediate drive wheels, a connecting rod between said knuckle-drive-joints, a steering mechanism operatively connected with the front and intermediate connecting rods to operate the same simultaneously, a power plant including a main drive shaft, differentials carried by said rear and intermediate drive shaft, a driving shaft between the respective differentials, a third differential coöperating with said driving shaft and a driving connection between said main drive shaft and said third differential, all being arranged whereby the rear and intermediate wheels may operate as driving wheels and the front and intermediate wheels as steering wheels, means for flexibly connecting said chassis frame with the front and rear axle structure, said flexible connecting means comprising supplemental frame bars flexibly connected at their ends with the respective rear and intermediate axle structures and pivotally and yieldably connected with the chassis frame.

WALTER W. SWAN.

Witnesses:
M. Freeman,
A. T. Lewis.